US012539254B2

(12) United States Patent
Ando

(10) Patent No.: US 12,539,254 B2
(45) Date of Patent: Feb. 3, 2026

(54) SEMEN COLLECTION SHEET

(71) Applicant: ONLY STYLE INC., Tokyo (JP)

(72) Inventor: Shintaro Ando, Tokyo (JP)

(73) Assignee: ONLY STYLE INC. (JP)

( * ) Notice: Subject to any disclaimer, the term of this patent is extended or adjusted under 35 U.S.C. 154(b) by 473 days.

(21) Appl. No.: 17/925,412

(22) PCT Filed: May 20, 2021

(86) PCT No.: PCT/JP2021/019109
§ 371 (c)(1),
(2) Date: Nov. 15, 2022

(87) PCT Pub. No.: WO2021/241379
PCT Pub. Date: Dec. 2, 2021

(65) Prior Publication Data

US 2023/0181418 A1 Jun. 15, 2023

(30) Foreign Application Priority Data

May 29, 2020 (JP) ................................ 2020-094804

(51) Int. Cl.
*A61J 1/05* (2006.01)

(52) U.S. Cl.
CPC ...................................... *A61J 1/05* (2013.01)

(58) Field of Classification Search
CPC ............... A61B 10/0058; A61B 10/007; A61F 5/451; A61F 5/453; A61F 5/455; A61J 1/05
See application file for complete search history.

(56) References Cited

U.S. PATENT DOCUMENTS 2,491,799 A * 12/1949 May ........................ A61F 5/451 604/347
3,099,017 A * 7/1963 Sullivan ................ A61G 9/006 4/144.2

(Continued)

FOREIGN PATENT DOCUMENTS

CN 2078164 U 6/1991
JP H8-299347 A 11/1996

(Continued)

OTHER PUBLICATIONS

International Search Report (English and LANGUAGE) in PCT/JP2021/019109, mailed Jul. 13, 2021; ISA/JP (6 bages).
Office Action issued in Japanese Patent Application No. 2020-094804, issued Oct. 13, 2020 (6 pages).

(Continued)

*Primary Examiner* — Jessica Arble
(74) *Attorney, Agent, or Firm* — Harness, Dickey & Pierce, P.L.C.

(57) ABSTRACT

A semen collection sheet has a front surface to which semen attaches and a back surface having a fixing portion, and when the sheet is unfolded, a reservoir portion is formed to accumulate semen that attaches to the front surface. In a clinic, at home, or other appropriate environment, a user unfolds the semen collection sheet and fixes the sheet to a mounting surface such that the reservoir portion is positioned vertically downward. A user ejaculates aiming at a target portion. Ejaculate semen attaches to the front surface and runs down along the front surface under gravity, and accumulates in the reservoir portion.

8 Claims, 5 Drawing Sheets

(56) References Cited

U.S. PATENT DOCUMENTS

| | | | | | |
|---|---|---|---|---|---|
| 3,306,515 | A * | 2/1967 | Beaumont | A61G 9/006 | 4/144.2 |
| 3,346,883 | A * | 10/1967 | Ersek | A61B 10/0045 | 4/315 |
| 4,886,509 | A * | 12/1989 | Mattsson | A61F 13/471 | 604/389 |
| 5,772,644 | A * | 6/1998 | Bark | A61M 1/79 | 600/580 |
| 2015/0000027 | A1* | 1/2015 | Hughes | A47K 11/00 | 4/479 |
| 2015/0250656 | A1* | 9/2015 | Maksimow | A61F 13/4704 | 604/374 |
| 2017/0231805 | A1* | 8/2017 | Lin | A61F 5/451 | 4/144.2 |
| 2019/0358080 | A1 | 11/2019 | Yang | | |

FOREIGN PATENT DOCUMENTS

| | | | |
|---|---|---|---|
| JP | H8-332206 | A | 12/1996 |
| JP | 2004-264100 | A | 9/2004 |
| JP | 2006-145308 | A | 6/2006 |
| JP | 3127812 | U | 12/2006 |
| JP | 2007-033421 | A | 2/2007 |
| JP | 2019-126453 | A | 8/2019 |
| JP | 2020-513867 | A | 5/2020 |

OTHER PUBLICATIONS

Office Action issued in Japanese Patent Application No. 2020-094804, issued Jul. 7, 2020 (7 pages).

Office Action issued in the corresponding Chinese Patent Application No. 202180038057.9; issued Aug. 7, 2025 (total 15 pages).

* cited by examiner

SEMEN COLLECTION SHEET

CROSS REFERENCE TO RELATED APPLICATIONS

This application is a U.S. National Phase Application under 35 U.S.C. 371 of International Application No. PCT/JP2021/019109, filed on May 20, 2021, which claims priority to Japanese Patent Application No. 2020-094804, filed on May 29, 2020. The entire disclosures of the above applications are expressly incorporated by reference herein.

BACKGROUND

Technical Field

The present invention relates to a device for collecting semen.

Background Art

In assisted reproductive technology (ART) such as artificial insemination and in vitro fertilization, a patient manually stimulates himself to provide semen for collection in a container (Japanese Patent Application Laid-Open No. 2019-126453).

To provide semen for collection, the patient is required to hold a container with one hand and stimulate his genitalia with the other hand. Generally, a size of the collection container is not large, and due to movement of the patient during stimulation and upon ejaculation it is difficult for the patient to accurately provide ejaculated semen into the container. If semen ejaculated outside the container is collected for deposition within the container, there is a risk of bacterial and other contamination.

An object of the present invention is to improve a collection rate of ejaculated semen.

SUMMARY

According to one aspect of the present invention, there is provided a semen collection sheet that has a front surface to which semen attaches and a back surface that has a fixing part. When the semen collection sheet is unfolded, a reservoir portion is formed for accumulation of semen that attaches to the front surface.

Effects of the Invention

According to the present invention, a collection rate of ejaculated semen is improved.

DETAILED DESCRIPTION

Example

An overview of the semen collection sheet 1 and use of the same will now be described.

Figure 1:
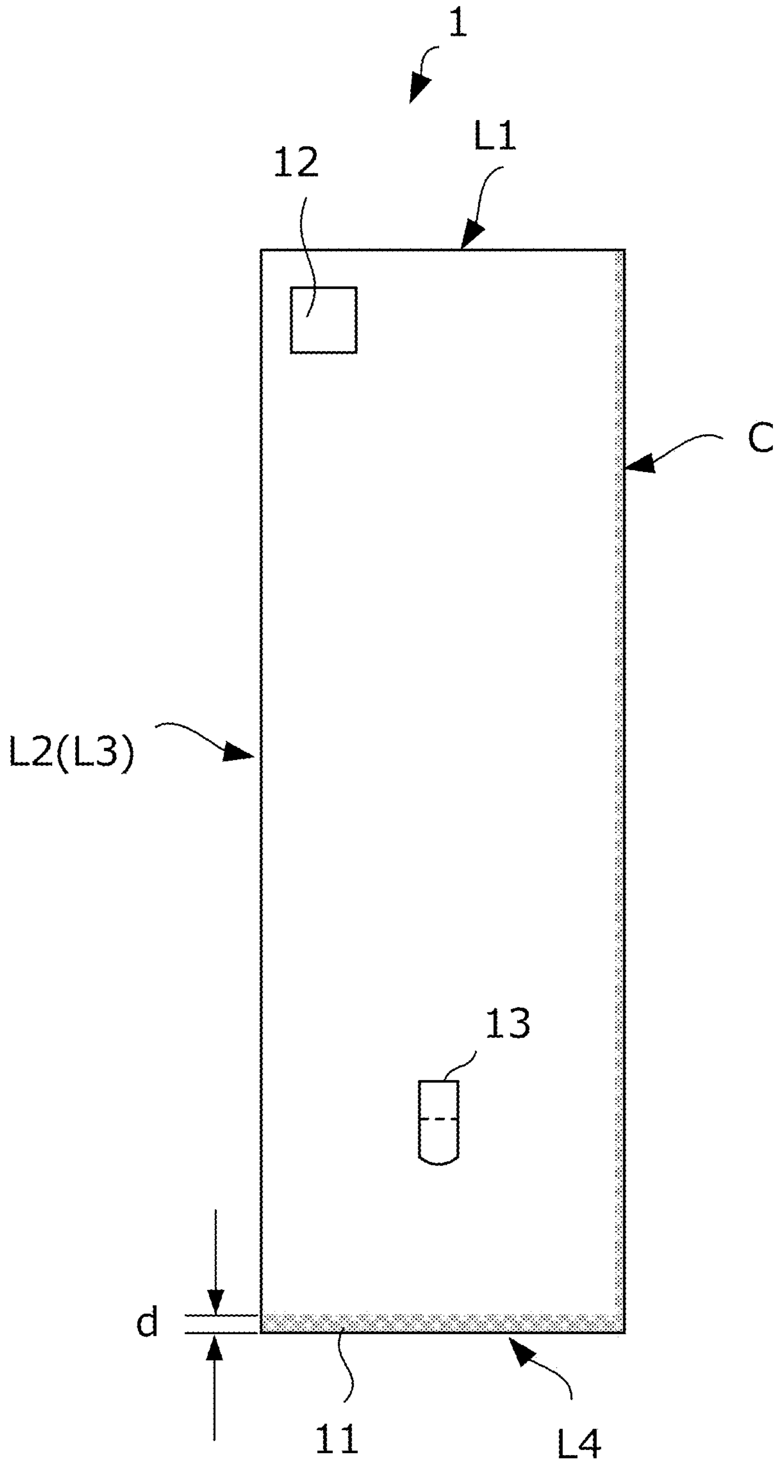
FIG. 1 is a view of a semen collection sheet 1 before use (folded state).
Figure 2:
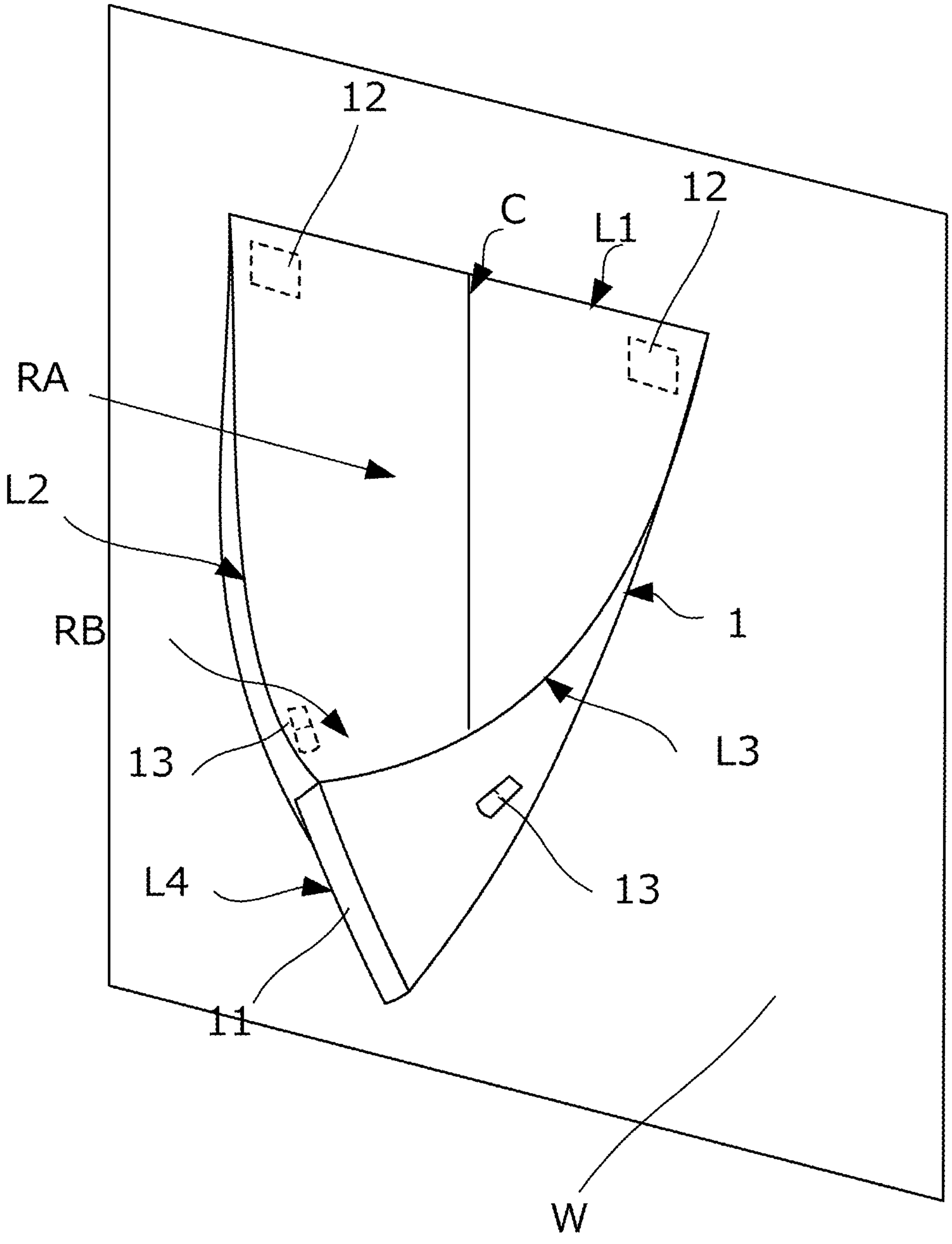
FIG. 2 is a perspective view of the semen collection sheet 1 in use (unfolded state).

FIG. 1 is a view showing the state of the semen collection sheet 1 before use (for example, at a time of sale); and FIG. 2 is a perspective view showing the state of the semen collection sheet 1 upon use. the state in which a user is using the semen collection sheet 1. In a clinic, at home, or other appropriate environment, a user unfolds the semen collection sheet 1 from the state shown in FIG. 1 and fixes the unfolded sheet to a mounting surface W (wall surface or the like) such that a reservoir portion RB, which is formed in the unfolded state, is at a vertically downward position on the sheet, as shown in FIG. 2. In this affixed unfolded state, when semen attaches to the inner front surface (hereinafter, on occasion, simply referred to as a front surface) the attached semen accumulates in the reservoir portion RB. To carry out a semen collection procedure, the user ejaculates while aiming at a target portion RA. Ejaculated semen attaches to the front surface and under gravity moves downward along the front surface and accumulates in the reservoir portion RB. Using a device such as a syringe (not shown), the user draws up the semen that has accumulated in the reservoir portion RB, and transfers the semen into a storage container (not shown), thereby completing the semen collection procedure. The used semen collection sheet 1 is discarded.

The structure and method of manufacture of the semen collection sheet 1 will now be described in detail. The size of the semen collection sheet 1 is, for example, A4 size (297×210 mm). For use as the material of the semen collection sheet 1, it is preferable that at least the front surface to which semen attaches is treated to have liquid-repellent properties. Namely, the front surface is treated to have properties to repel water, mud, oil, and proteins (such as those present in semen). Typical liquid-repellent treatment methods include a hot-melt type, a lacquer coat type, and the like, and any such method may be used. The liquid-repellent treatment can be realized by treating the front surface of a sheet material with a fluorine compound or a silicone resin. Alternatively, polyethylene glycol may be used in combination with glucose or sucrose.

In this embodiment, any appropriate known liquid-repellent treatment can be used. However, to realize an uneven front-surface structure that provides a so-called lotus effect, for the front-surface liquid-repellent treatment it is preferable to use a super liquid-repellent material that has a high contact angle with a liquid (for example, 170° or more).

In addition, it is preferable that the back surface is made of a material on which fixing portions 12 and/or holding portions 13 can be provided with ease.

As a material for the semen collection sheet 1, a sheet having a double structure can be used. Such a sheet comprises a polyethylene terephthalate (PET) film having a thickness of about 1 μm to 30 μm (micrometers) as the back surface, and a linear low-density polyethylene (L-LDPE) film having a thickness of about 40 μm to 100 μm, which is treated to be liquid-repellent, as the front surface, with overlap between the two films. More preferably, the thickness of the PET film is 12 μm, and the thickness of the L-LDPE film is 75 μm. While such thicknesses may slightly impede handling of the reservoir portion RB (during folding or unfolding), a resultant weight of the reservoir portion RB imparts stability to the unfolded reservoir portion RB. Accordingly, an overall thickness of about 50 μm to 100 μm, which enables ease of handling without compromising stability, is preferable.

In addition, the front surface may be subjected to anti-bacterial processing. The described physical properties, thickness, and size of the sheet material are merely examples, and can be appropriately determined as required.

As shown in FIG. 1, the rectangular-shaped semen collection sheet 1 having sides L1, L2, L3, and L4 is folded vertically in half along a center line C and joined to the side L4. In FIG. 1, a joining portion 11 (a rectangle having a width d in the drawing) is formed. To create the join, a process such as crimping, welding, adhering, or any other suitable method can be adopted. On the back surface, two fixing portions 12 and two holding portions 13 are provided at symmetrical positions about the center line C.

The fixing portion 12 is an adhesive member such as a double-sided adhesive tape or the like, and has one surface adhered in advance to the back surface of the semen collection sheet 1, and a protective seal attached to the other surface. At a time of use, the user peels off the protective seal and adheres the other surface at a desired position.

The holding portions 13 comprise a sheet-shaped member, the upper half of which is adhered to the outer surface of the semen collection sheet 1 and the lower half of which is not adhered, and can be pinched (upon holding) when the user unfolds the semen collection sheet 1.

When using the semen collection sheet 1, the user is not required to hold a container with one hand during masturbation, and the semen collection sheet 1 can be fixed at an appropriate position taking into account a height and body shape of the user, whereby the user can perform ejaculation while maintaining a relaxed posture. In addition, since an area to which the ejaculated sperm adheres is larger than that of a conventional container, even if a direction of ejaculation slightly deviates from the intended direction, collection of the sperm is less likely to be affected. In addition, since the semen collection sheet 1 can be manufactured from a sheet member by use of simple processing, a cost of manufacturing the sheet can be kept low. Therefore, although the semen collection sheet 1 is designed for single use, the sheet is cost-effective since it can be provided at a low price. In addition, since the user can unfold and appropriately fix the semen collection sheet 1 by pinching and holding the holding portions 13, a risk of contamination of collected semen with bacteria or the like is avoided.

In recent years, there has been an increase in the number of methods by which people collect sperm outside of medical facilities (at home and the like) and inject the collected sperm into a vagina by use of a syringe and the like (for convenience, referred to herein as a "syringe method"). Specifically, a user purchases a product set with a syringe and a plastic folding cup (for convenience, referred to herein as a "syringe method kit") or the like and injects the sperm into a vagina. However, a syringe method kit is inconvenient since it is difficult to increase a size of a provided cup due to restraints on package size and the like. By use of the semen collection sheet 1 according to the present invention, since the semen collection sheet 1 is compact when folded, and when unfolded has a large area for collecting semen, the semen collection sheet 1 is also suitable for use in a syringe method kit.

Example Modification

Figure 3:
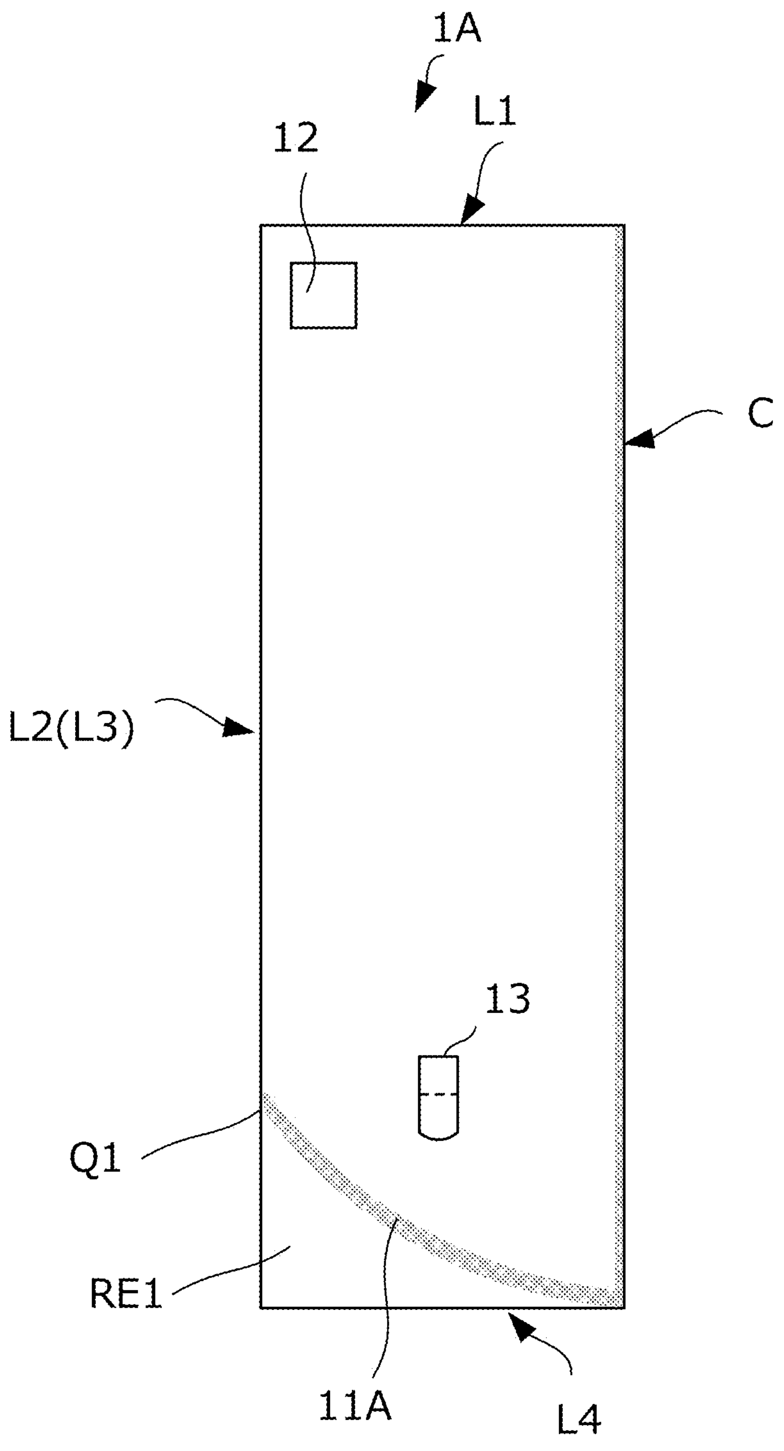
FIG. 3 is a view of a semen collection sheet 1A before use (folded state).

The joining portion 11 need not be formed along one side of the semen collection sheet 1. For example, as with a semen collection sheet 1A shown in FIG. 3, a joining portion 11A may be formed as an arcuate band region from the lowest end on the center line C to a point Q1 on the side L2 (L3). A region RE1 below the joining portion 11A may be cut away after the joining portion 11A is formed, or may be left as it is.

Figure 4:
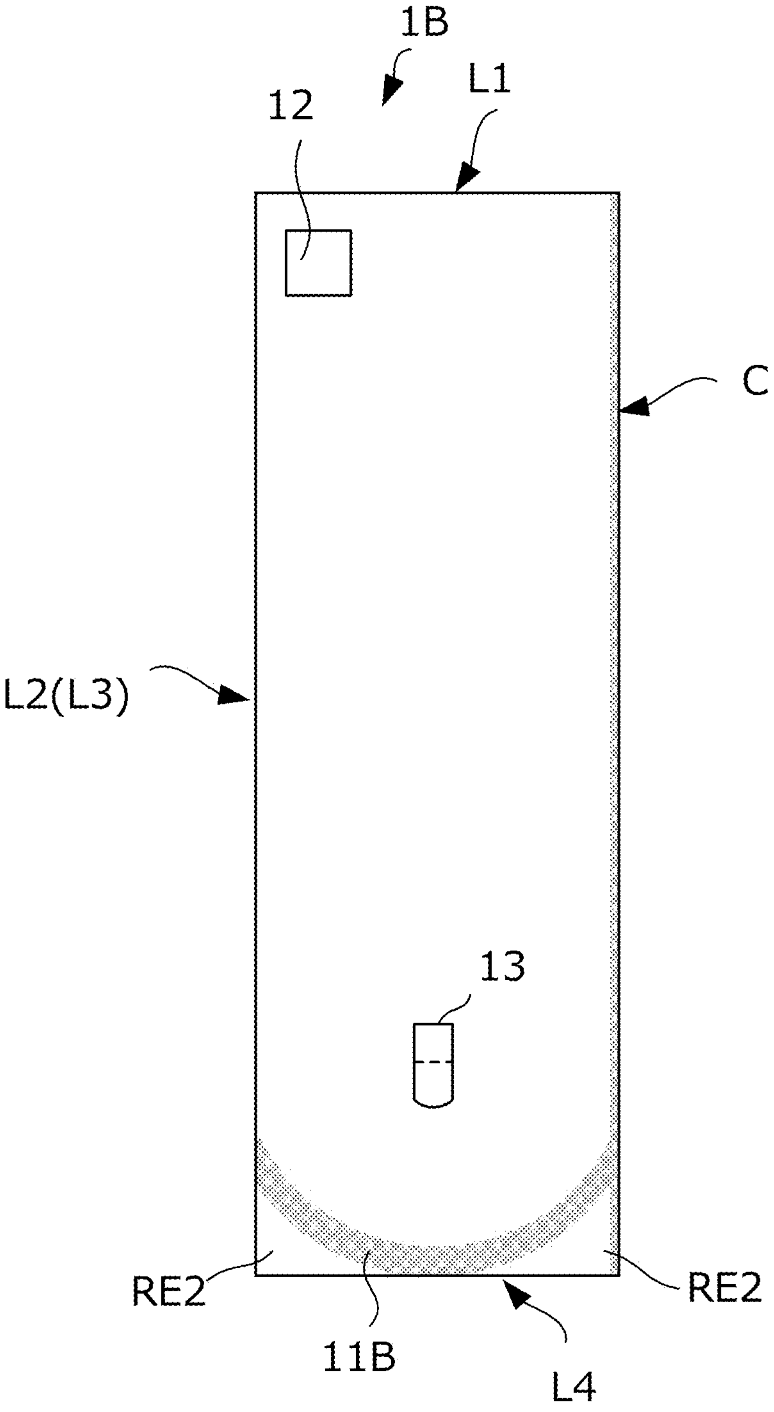
FIG. 4 is a view of a semen collection sheet 1B before use (folded state).

Alternatively, as with a semen collection sheet 1B shown in FIG. 4, a joining portion 11B may be formed as a band region in which the center of the arc is in contact with the center of the side L4. A region RE2 below the joining portion 11B may be cut away after the joining portion 11B is formed, or may be left as it is.

Figure 5:
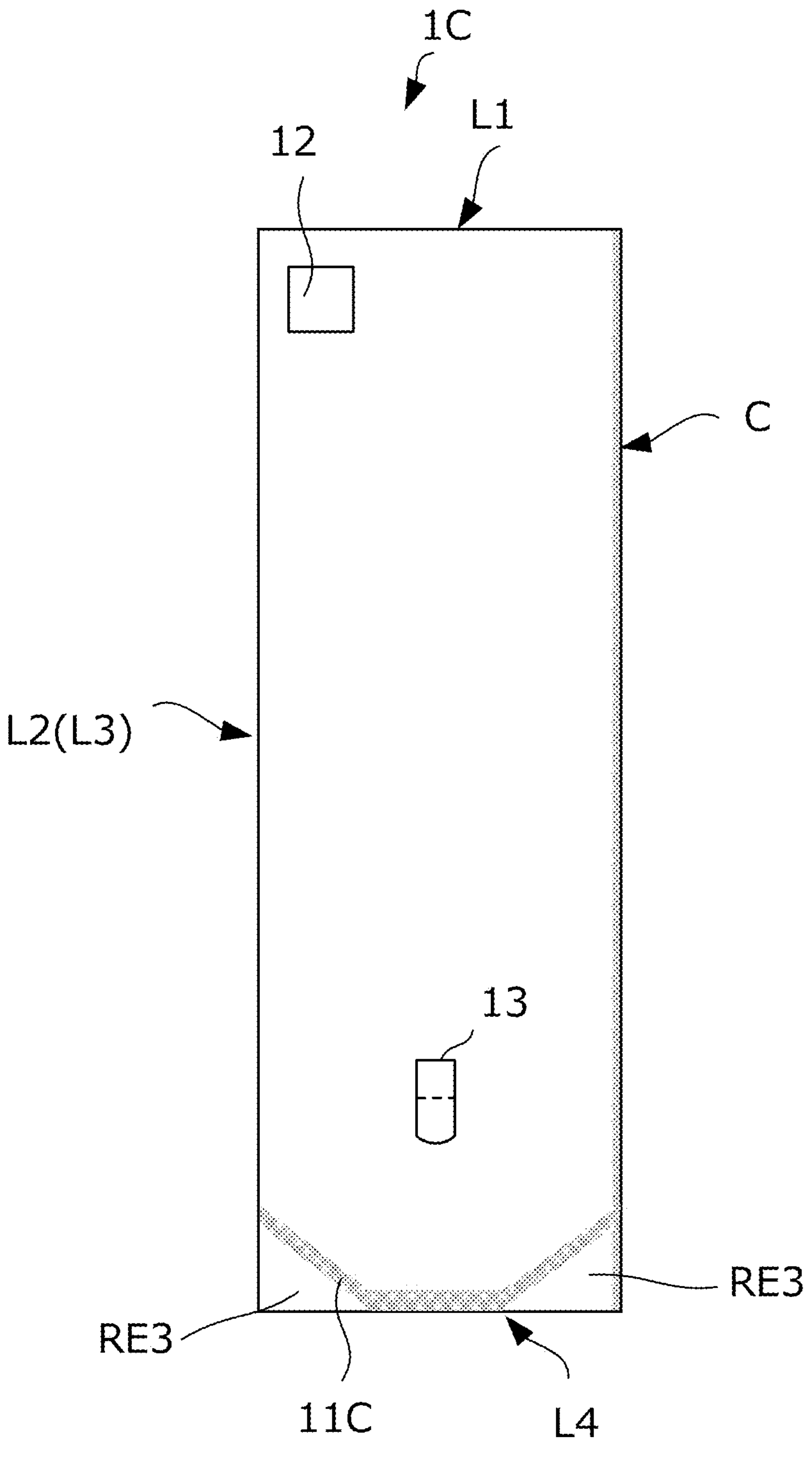
FIG. 5 is a view of a semen collection sheet 1C before use (folded state).

Alternatively, as with a semen collection sheet 1C shown in FIG. 5, a joining portion 11C may be formed as a band region in which a band portion along the side L4, a band portion extending from the side L4 to a point on L2 (L3), and a band portion extending from the side L4 to a point on the center line C are combined. A region RE3 below the joining portion 11C may be cut away after forming the joining portion 11B, or may be left as it is.

In short, in the present invention it suffices for one sheet member to be joined to form a joining portion such that when the joining portion is unfolded a reservoir portion (in other words, a hollow or a pocket portion) is created for accumulation of semen. The shape of the joining portion described above is merely an example, and may be configured as appropriate depending on a desired shape of the reservoir portion. However, it is preferable that the joining portion (that is, the shape of the formed reservoir portion) be symmetrical about the center line.

Preferably, as illustrated in FIGS. 1 and 3 to 5, the reservoir portion is configured by folding one sheet member in half and joining the band-shaped regions (11A, 11B, and 11C) that connects a point on a folded line to a point on an overlapping side parallel to the folded line. Thus, when the sheet is unfolded for use, semen that attaches to the front surface of the sheet accumulates in the reservoir portion. Here, the shape of the band-shaped region is merely an example, and can be configured as appropriate.

The holding portions 13 may be omitted. Even if omitted, since the joining portion 11 functions as a handle, the user can unfold the sheet without touching the inside by pinching and holding the joining portion 11 at a time of unfolding.

The fixing portions 12 may be omitted. That is, instead of the product being sold with the fixing portions 12 being provided, the user may attach the double-sided tape at a desired position. In addition, the shape, position, size, fixing method, and mechanism of the fixing portion 12 are not limited. For example, as a method for fixing the semen collection sheet 1, instead of using adhesive, a hole may be formed at each of the left and right sides of the upper end of the semen collection sheet 1, and S-shaped hooks or other provided hooks inserted by the user into the holes for hanging from a bar-shaped member or the like. Alternatively, the semen collection sheet 1 may be fixed by using a fixing member such as a stand with a provided clip for use by the user without provision of a fixing mechanism such as holes or an adhesive sheet.

The position where the fixing portions 12 is provided depends on a strength of the material of the semen collection sheet 1, but so long as the shape shown in FIG. 2 can be maintained, the mounting position need not be near the upper end of the semen collection sheet 1. In this case, even if the user touches the collection surface of the sheet when fixing the sheet, from a viewpoint of hygiene a possibility of semen coming into contact with the area of the sheet touched by the user is small. It is preferable, however, that the fixing portions be provided at a position as far as possible from the center portion of the semen collection sheet 1 (the region to which semen will most likely attach).

The folded line may be formed along the center line C. In addition, the user may make a horizontal folded line. For example, by making a horizontal folded line at a trisection position, a plurality of semen collection sheets 1 can be folded and packed to realize compact packaging.

The target portion RA may be printed with a mark that serves as a reference for a direction of ejaculation, such as a concentric target pattern.

In short, the semen collection sheet according to the present invention has a front surface to which semen attaches and a back surface having a fixing means, and when unfolded has a reservoir portion for accumulating semen that attaches to the front surface.

The invention claimed is:

1. A semen collection sheet comprising:

a front surface;

a back surface opposite the front surface;

a fold line dividing the back surface into two parts such that the semen collection sheet can be switched from a folded state to an unfolded state; and a first fixing portion and a second fixing portion provided on the back surface, the first fixing portion and the second fixing portion facing oppositely away from the front surface, the first fixing portion and the second fixing portion being configured to attach the semen collection sheet to a discrete mounting surface, wherein the semen collection sheet is joined to itself only along a joining portion at one end thereof;

when the semen collection sheet is in the folded state, the first fixing portion and the second fixing portion face opposite directions; and when the semen collection sheet is, in the unfolded state:

a target area, to which semen attaches, is formed at the front surface;

a reservoir portion is formed to accumulate the semen that attaches to the front surface;

a mounting portion is formed at the back surface, wherein the mounting portion is located opposite to the target area; and the first fixing portion, the second fixing portion, and the mounting portion all face the same direction.

2. The semen collection sheet according to claim 1, wherein the reservoir portion is formed by joining one sheet member only along the joining portion.

3. The semen collection sheet according to claim 2, wherein the reservoir portion is configured by folding the one sheet member in two and joining band-shaped regions connecting a point on the fold line to a point on one overlapping side parallel to the fold line, to accumulate the semen attached to the front surface when unfolded.

4. The semen collection sheet according to claim 1, wherein each of the first fixing portion and the second fixing portion is an adhesive member.

5. The semen collection sheet according to claim 1, further comprising:

first and second holding portions that are formed on the back surface to support the reservoir portion when unfolded, the first holding portion being formed on a first side of the fold line dividing the back surface into the two parts, and the second holding portion being formed on a second side of the fold line.

6. The semen collection sheet according to claim 5, wherein the first and second holding portions are located at different locations on the back surface than the first and second fixing portions.

7. The semen collection sheet according to claim 1, wherein the back surface of the semen collection sheet has a perimeter edge; and the first fixing portion and the second fixing portion are provided inboard of the perimeter edge.

8. The semen collection sheet according to claim 1, wherein in the unfolded state, the first fixing portion and the second fixing portion are substantially co-planar with the mounting portion.

* * * * *